United States Patent [19]

Smith

[11] Patent Number: 5,249,118
[45] Date of Patent: Sep. 28, 1993

[54] FULLY ADAPTIVE VELOCITY TRACKING DRIVE CONTROL POSITIONING SYSTEM

[75] Inventor: Wayne T. Smith, San Rafael, Calif.

[73] Assignee: Golden Gate Microsystems Incorporated, San Rafael, Calif.

[21] Appl. No.: 753,898

[22] Filed: Sep. 3, 1991

[51] Int. Cl.$^5$ .................... G05B 19/18; G05B 19/407
[52] U.S. Cl. ........................ 364/167.01; 318/568.18
[58] Field of Search .................. 364/167.01, 148, 149, 364/150, 151; 318/561, 630, 363, 365, 369, 374, 612, 650, 568.18; 395/85

[56] References Cited

U.S. PATENT DOCUMENTS

| | | | |
|---|---|---|---|
| 3,723,843 | 3/1973 | Pearson | 318/612 |
| 4,353,019 | 10/1982 | Sweeney, Jr. | 318/561 |
| 4,609,954 | 9/1986 | Bolton et al. | 318/561 |
| 4,651,073 | 3/1987 | Shimizu et al. | 318/369 |
| 4,710,865 | 12/1987 | Higomura | 364/167.01 |
| 4,761,595 | 8/1988 | Goor | 364/167.01 |
| 5,010,283 | 4/1991 | Kitajima et al. | 318/374 |

Primary Examiner—Jerry Smith
Assistant Examiner—Paul Gordon
Attorney, Agent, or Firm—Thomas M. Freiburger

[57] ABSTRACT

An infinitely adaptive motor control positioning system is disclosed which uses a calculated variable velocity curve while tracking deceleration and acceleration before and after application of a power pulse so as to anticipate movement for continuing adjustable power cycles. This enables the system to optimize positioning accuracy and minimize elapsed time positioning a driven mechanism. Up to seven phases of drive occur in any positioning move. Each phase consists of drive cycles when the motor receives power (and thus accelerates) and then is void of power (and thus decelerates). During each drive cycle, different sets of equations are implemented to calculate an "ideal speed" based upon the system response, actual speed, previously used power, and the distance still required to reach the target. The appropriate power computing equation is selected from a set of equations based upon a combination of factors: comparison of actual speed to "ideal" speed; pattern of speed change during the previous cycles; previous powers used; the velocity error; proximity to a phase transition; and the general trend of the mechanism response. The final target approach uses current position, speed, and deceleration to project the stopping point if no more power is supplied. Then a new velocity curve is calculated in reference to the target position and remaining distance to evaluate how the next power cycle should be controlled. Initially, power is applied in varying degrees to obtain broad information on the acceleration and deceleration characteristics of the driven mechanism. With this data, the power is adjusted to control the speed so that the driven mechanism can eventually coast to a stop within the defined settling tolerance of the target.

11 Claims, 11 Drawing Sheets

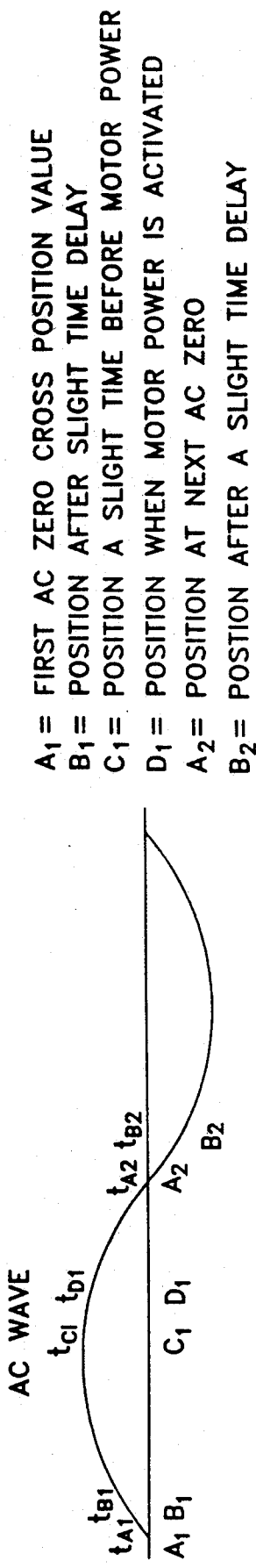

Fig. 6

$A_1$ = FIRST AC ZERO CROSS POSITION VALUE
$B_1$ = POSITION AFTER SLIGHT TIME DELAY
$C_1$ = POSITION A SLIGHT TIME BEFORE MOTOR POWER
$D_1$ = POSITION WHEN MOTOR POWER IS ACTIVATED
$A_2$ = POSITION AT NEXT AC ZERO
$B_2$ = POSITION AFTER A SLIGHT TIME DELAY $X_H$ = CURRENT POSITION AT THIS POINT ON THE AC WAVE FORM.

$t_{YH}$ = TIME OF CURRENT POSITION READING.

$$\frac{|A_1 - B_1|}{t_{B1} - t_{A1}} = \text{APPROXIMATE PEAK SPEED DURING DRIVE CYCLE } (V_{MAX\,1})$$

$$\frac{|C_1 - D_1|}{t_{D1} - t_{C1}} = \text{APPROXIMATE LOW SPEED DURING DRIVE CYCLE } (V_{MIN\,1})$$

$$\frac{|A_1 - A_2|}{t_{A2} - t_{A1}} = \text{AVERAGE DRIVE SPEED DURING DRIVE CYCLE } (V_{AVE\,1})$$

$$\frac{|A_2 - B_2|}{t_{B2} - t_{A2}} = \text{APPROXIMATE PEAK SPEED DURING DRIVE CYCLE } (V_{MAX\,2})$$

$$\frac{V_{MAX\,1} - V_{MIN\,1}}{t_{D1} - t_{B1}} = \text{EXPECTED NEXT DECELERATION RATE}$$

$$\frac{V_{MAX\,2} - V_{MIN\,1}}{t_{B2} - t_{D1}} \Big/ \text{LAST POWER} = \text{EXPECTED NEXT ACCELERATION/POWER APPLIED}$$

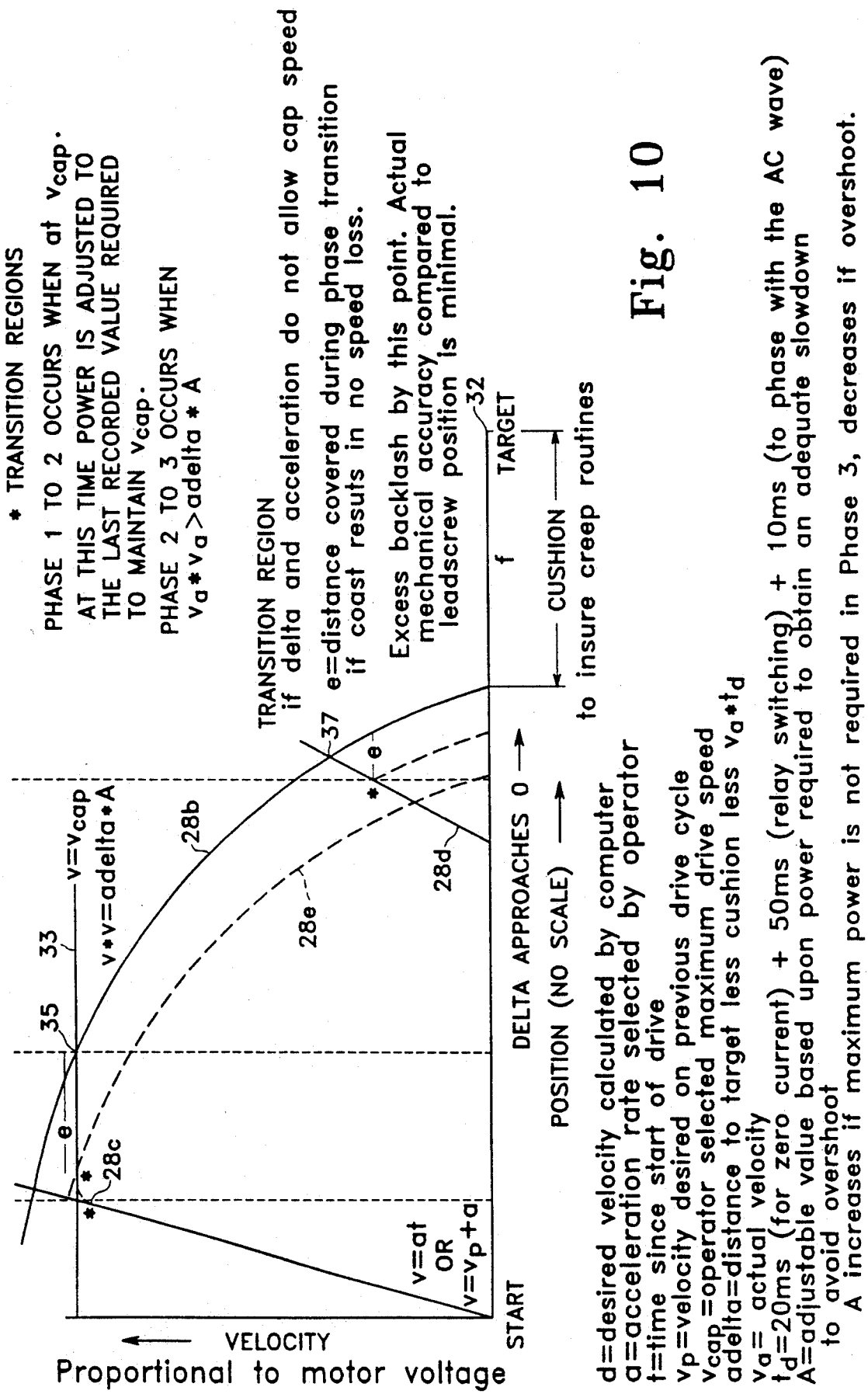

FULLY ADAPTIVE VELOCITY TRACKING DRIVE CONTROL POSITIONING SYSTEM

BACKGROUND OF THE INVENTION

The invention relates generally to control of the movement of a motor driven machine element or mechanism, and in particular the invention is concerned with an adaptive drive control positioning system which tracks and stores velocity, deceleration and acceleration, both in a current drive cycle and in previous drive cycles, to anticipate the effects of motor drive on machine element position so that drive power can be shut off at a correct point for the machine element to coast to the target position.

A number of motor control systems have been suggested for achieving correct positioning of a driven mechanism or machine element with the objective of minimizing the time to reach the target position. U.S. patents disclosing such systems include Sweeney, Jr. U.S. Pat. Nos. 4,353,019 and 4,571,530, Sweeney U.S. Pat. No. 4,312,033, Davey U.S. Pat. No. 3,917,930, Pearson U.S. Pat. No. 3,723,843, and Higomura U.S. Pat. No. 4,710,865.

Sweeney, Jr. U.S. Pat. No. 4,353,019 discusses an adaptive pulsing motor control for a positioning system wherein the slow down from high speed is distance adaptive only. The final positioning requires a stop between pulses during settling. The stop period is set and relatively long (50 ms) which causes relatively slow settling response. The increased pulse width to the motor until motion has occurred can rock the mechanism loose from a static bind and cause immediate overshoot of the target. Velocity is not allowed to remain greater than zero until the final target is located.

The second Sweeney, Jr. patent is somewhat similar to the first, but includes the concept of "nudging" in the final approach positioning technique. In the "nudging" technique the pulses of the earlier Sweeney, Jr. patent are used but are not adapted significantly. Instead, to allow the computer to control two drives simultaneously, the DC power in the drive control circuit is adjusted.

Sweeney U.S. Pat. No. 4,312,033 disclosed a system employing a fast motor and a slow motor. The slow motor, used to effect the final few inches of movement, was pulsed on and off in the last few inches, to a series of complete stops. Such complete stops, particularly near the target position, are undesirable because of a "flex back" effect, i.e. the tendency of some mechanical components or assemblies to move backward (to relieve strain) immediately after being moved forward.

Davey U.S. Pat. No. 3,917,930 discusses "random" and "long term" errors in a system for adaptively positioning a machine element. These errors are adjusted for within range and step limitations on a block move by block move basis (displacement only, with no velocity evaluation). Positioning is accomplished on the basis of immediate stop and assumed zero coast of the mechanism. Further, to set up the Davey system for operation, a semi-manual pre-staging of the move is required, and all physical factors must stay basically the same for that specific move thereafter.

Pearson U.S. Pat. No. 3,723,843 discloses the use of dynamic breaking of a motor to bring the motor from a slow positioning speed to a stop without adjustment for variations in mechanism response. This would presumably result in poor performance, since it would tend to remove the driven mechanism from the face of the leadscrew and introduce an inherent error beyond the error created from the non-adaptive brake.

The Higomura patent has pertinence to the present invention in that it discloses use of velocity as a locating method. Higomura adapts velocity based on a very tight electronic control circuit which assumes it can adjust virtually immediately to any and all changes. The system dictates to the driven mechanism rather than reacting to the mechanism. There is no velocity profile evaluation and no on-the-fly adjustment of "fall over to target" value. Likewise, there appears to be no adjustment for the high speed deceleration entry point based on the actual current driven speed. Higomura's velocity curve, however, appears somewhat similar to that of the present invention described herein.

Positioning motors have been of three basic types in previous positioning systems: stepper motors, three-phase AC motors and DC motors with servo controllers. Stepper motors usually have up to five windings, with a driver required for each winding. Pure DC current is needed, and every winding must be connected properly. A stepper motor can slip, missing the next desired point. Further, there are limitations on speed, with relatively slow top speeds. In addition, stepper motors and the required controllers tend to be quite expensive.

Three-phase AC motors are relatively inexpensive, but require costly frequency converters. Further, these motors do not have good slow-down capability. Speed is controlled by a frequency controller. The Sweeney '033 patent discussed above employed two motors of this type, one for fast drive and one for slow drive.

In DC motor systems with servo control, the motor itself was not expensive, but a DC supply was required and the servo control systems tended to be large, expensive and complex.

The drive control positioning system of this invention is far more adaptive than any of the devices described in the above patents, and enables a target position of a machine element to be achieved quickly, efficiently and reliably.

In discussion of the problems addressed by the present invention and the features of the invention, certain terms are used herein and are defined as follows.

Delta: The distance remaining to the target position.

Drive Cycle: The half wave (of AC power) during which time the deceleration, motor drive, acceleration, and displacement are monitored by the drive system.

Fall Over Point: The distance from the target at which the driven mechanism will coast (fall) into the target zone by the time the speed diminishes to zero by means of natural deceleration (due to frictional losses). This value is a function of actual speed and anticipated deceleration due to mechanical losses (this is a non-linear curve since it is unlikely that the stored energy within the driven system is directly proportional to the velocity of the mechanism).

Flexback: The tendency of some mechanical assemblies to move backward (to relieve strain) immediately after being moved forward (or vice versa). This is particularly evident in driven mechanisms consisting of nylon, rubber, or other potentially elastic components. These components have their greatest effect when they are located farthest from the drive power source. The slower the actual velocity, generally the greater the effect of flexback.

Ideal Velocity Curve: A curve which results from plugging measured machine data into primary equations ($v = at$; $v = v_{cap}$; $v = A \times delta_{adj}$; $v \leq v_{base}$; curve $A_2 \leq v <$ curve A) which are used to define a series of phases of motor drive as described herein (see FIG. 1). The points where these curves cross over each other define the phase change points. This is used initially to determine with which phase to start the drive procedure. Thereafter, actual velocity is compared with this curve to determine when a change in phase is appropriate. Ideal velocity is dynamic and is modified as a positioning cycle progresses.

Ideal Speed: The speed defined by the delta and the ideal velocity curve.

Macroadaptation: The adjustments performed by the invention to evaluate, predict, and overcome the changes in the mechanical drive parameters which occur at higher velocities. This plays a major factor primarily in determining the braking entry point and power adjustment during deceleration during the positioning sequence or routine (see FIG. 1, Phase 3).

Microvariation: The changes in drag, static friction, dynamic friction, and coast which vary dramatically at low velocities. These can be caused by, among other things, localized dirt, irregular surfaces, uneven drive belts (or other transmission devices), out of round or misaligned pulleys, bent shafts or leadscrews, and motor brush cogging.

Microadaptation: The adjustment performed by the new electronics to overcome the effects of microvariation and allow fast, accurate positioning of any driven mechanism independent of the degree of variation of the mechanical parameters.

Pressure Faces: The surfaces of the power transmission devices (gears, wormgears, etc.) which make direct contact between the drive motor and driven mechanism to cause movement toward the target location. It is imperative that all of these surfaces remain substantially in contact when the target is obtained since position is monitored by a shaft encoder which does not measure directly off the driven mechanism or machine element. Generally shaft (i.e. a leadscrew) momentum is greater than momentum of the driven mechanism or machine element on coasting, keeping the pressure faces in contact during coasting to target.

Target: The position which is to be obtained by the driven mechanism.

Target Zone: The region defined by the target value plus or minus the selected settling tolerance.

Tolerance: The amount of acceptable error in positioning when the driven mechanism comes to a final stop.

SUMMARY OF THE INVENTION

The present invention allows a DC drive motor to run directly off any constant frequency AC power source with a minimal number of components. Conventionally, DC drive systems which required accurate positioning capability have required DC supplies and expensive servo control systems. These tend to be large, expensive to build, and involve greater complexities than a simple thyristor drive control operating directly off the AC power line. This invention provides a solution which allows accurate control with a simple thyristor drive to operate a DC motor at high speeds, decelerate rapidly and controllably to a slower (creep) speed region, and control the driven mechanism without the need for stopping on the way to the target, especially in the creep region. No brake mechanism or external deceleration mechanism is required, which could jar the driven mechanism from the face of the leadscrew (or wormgear, or other driving component) causing uncontrolled inaccuracies. Since the system of the invention is fully self-adaptive, it can be installed on almost any type of machine, requires no installer or operator set-up, and automatically adjusts for changes in the machinery due to wear, lubrication and maintenance.

The invention is described in the context of a system which drives a leadscrew for the purpose of precise positioning control. It is capable of performing on many types of equipment. Several improvements and new concepts are incorporated in the system of the invention as compared, for example, to U.S. Pat. No. 4,312,033. One of these improvements is the replacement of the AC motor of the patent with a single DC drive motor capable of supplying both the high speed and an infinitely variable low speed (see U.S. Pat. Nos. 4,353,019 and 4,571,530). The system of U.S. Pat. No. 4,312,033 required stopping to reset a pulse base length for the motor power. Power was then pulsed in increasing increments until motion again was seen, and then the procedure was repeated. Initiating motion required breaking past the energy limit created by static friction. Once this barrier was passed, actual displacement could be much greater than desired, since static friction yielded to dynamic friction and coasts could become appreciable. Additionally, what was actual motion (in the leadscrew), and what was a forerunner to built up pressures which could cause flexback, was difficult to differentiate. The requirement to stop between motion pulses placed a significant burden on the operating efficiency of the system.

The present invention overcomes this problem by eliminating the need to stop. Instead, motion is maintained while velocity is fluctuated so that a good idea of the effect of supplying power (to increase velocity) and removing power (causing natural deceleration—related to coast and eventual displacement) can be achieved. This information allows the control system to set up the proper drive speed at the proper distance from the target to "fall" into position accurately. The maximum speed and fall over position are based upon the variation in acceleration and deceleration values measured. Generally, on systems with high coast, the maximum speed and the ultimate "falling" distance are reduced. On low coast systems these values can often be increased (due to a generally lower probability of variation). In any case, the adjustment for these factors is performed automatically by the invention.

Due to improvements in hardware and software design, as compared to the system of U.S. Pat. No. 4,312,033, the control package is reduced in size by the invention from approximately 12 cubic feet (with 11 PC boards) to 0.05 cubic foot with only a single control PC board. New technology has significantly reduced the number of components and connections, thus eliminating most of the electronic failures seen in previous units. The system of the invention does not require mechanical adjustments to allow proper operation, and greatly reduces the need for regular maintenance. Cost of the system as well as operation is substantially reduced. Installation and service has been greatly simplified. The DC motor can now be operated directly from an AC power line (at any voltage) in an SCR drive, with only one single major drive component.

It is therefore among the objects of the invention to greatly improve the efficiency, accuracy, reliability and cost of a drive control positioning system, through a series of improvements and adaptive control features whereby both historical performance and current performance are monitored through powered and coasting segments of machine element motion so as to accurately set up the rotational and translational components of the system to "coast" or "fall" into accurate target position. These and other objects, advantages and features of the invention will be apparent from the following description of preferred embodiments, considered along with the accompanying drawings.

DESCRIPTION OF THE DRAWINGS

FIG. 6 shows an A/C wave form graph and calculation technique for the average velocity, the maximum and minimum speeds and the acceleration and deceleration rates during the power cycle.

FIG. 10 is a graph demonstrating the selection of phases for a particular positioning routine, as well as the use of the e distance to assure correct entry to the fallover point.

DESCRIPTION OF PREFERRED EMBODIMENTS

Figure 1:
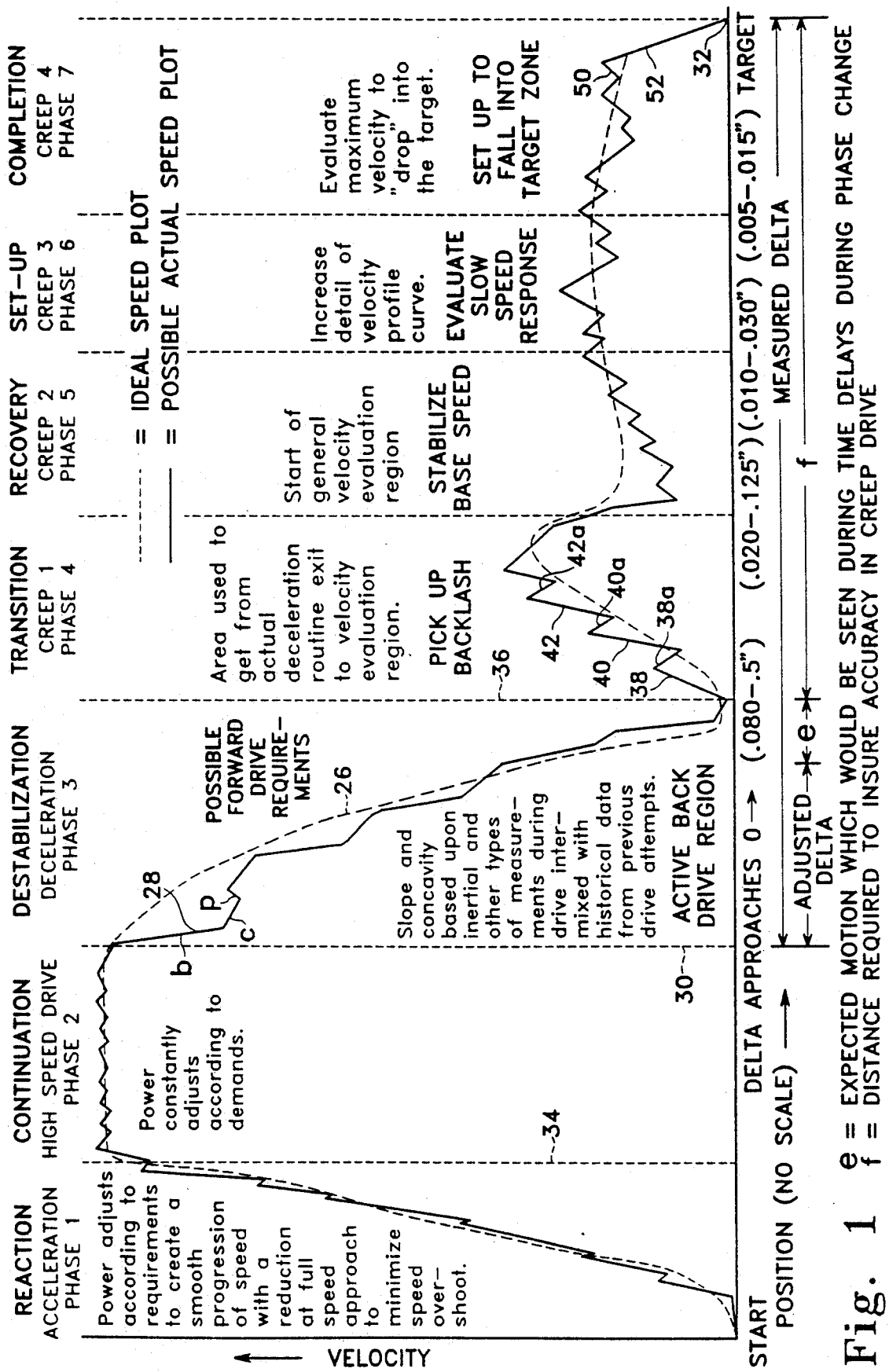
FIG. 1 is a graph showing an "ideal velocity" path (broken line) of the driven mechanism or machine element as defined by basic equations for speed. The graph shows different phases which can be defined by crossover points of the calculated velocity lines.

The system of the invention allows accurate positioning of any driven mechanism while still yielding high maximum speeds, as shown in FIG. 1. In positioning of a machine element of relatively short travel such as a backgauge on a paper cutting machine, a practical limit to speed may be about sixteen inches per second. The discussion of this preferred embodiment to some extent reflects a driven mechanism or work element which moves in this general range of speed, although in some situations to which the invention is applicable, the maximum practical speed can be considerably higher.

Figure 2:
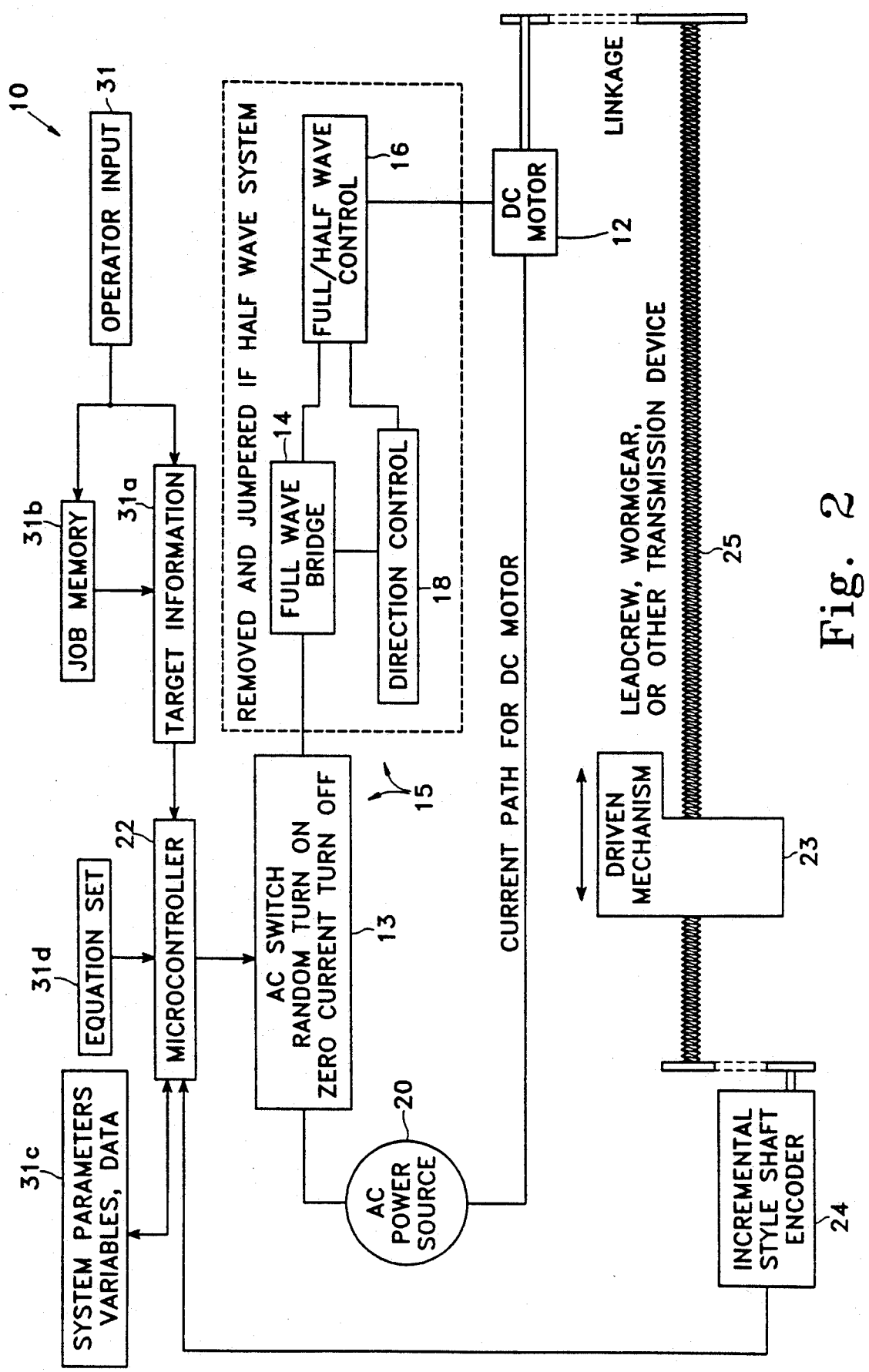
FIG. 2 is a block/schematic diagram showing components of the system of the invention in block form, and also showing a drive element such as a leadscrew, wormgear or other transmission device driving a machine element or driven mechanism in forward/back directions. The drawing indicates that the system may be operated to drive the DC motor with either full wave AC power or half wave AC power.
Figure 3:
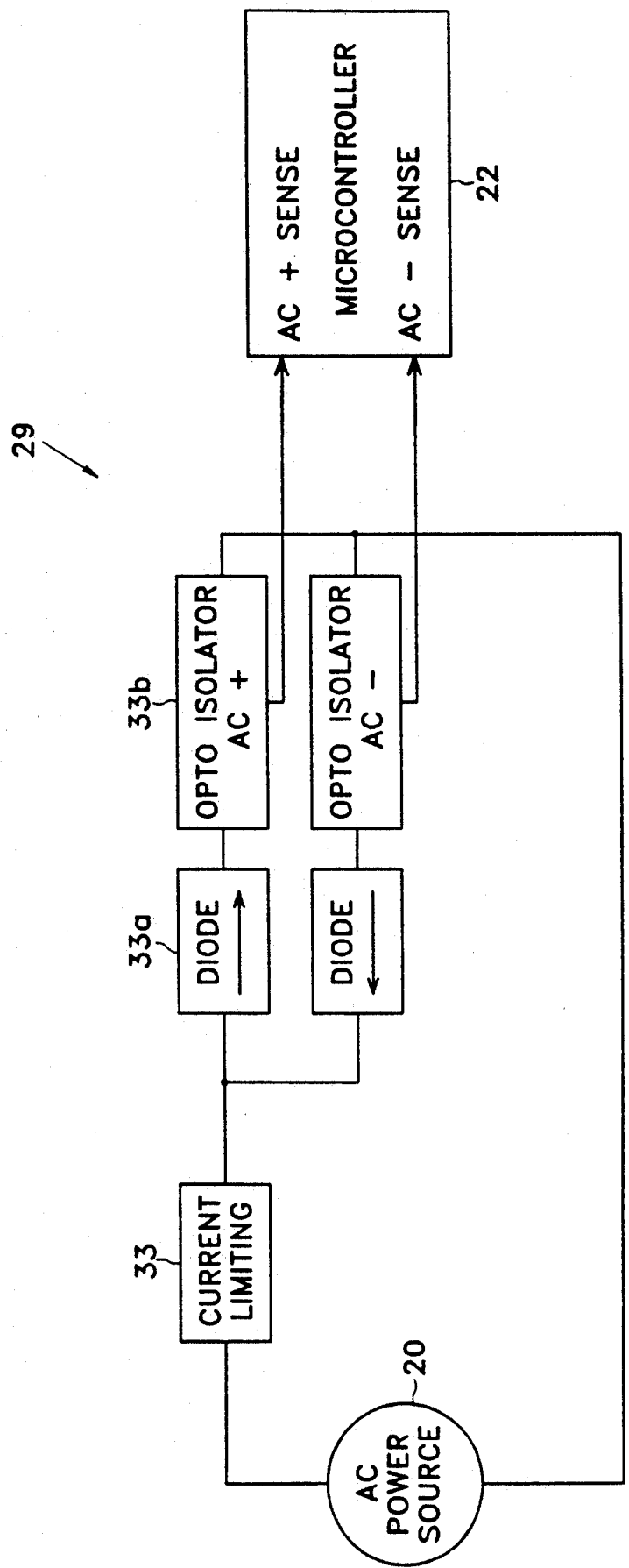
FIG. 3 is a block diagram showing an AC zero cross circuit for computer sensing.
Figure 4:
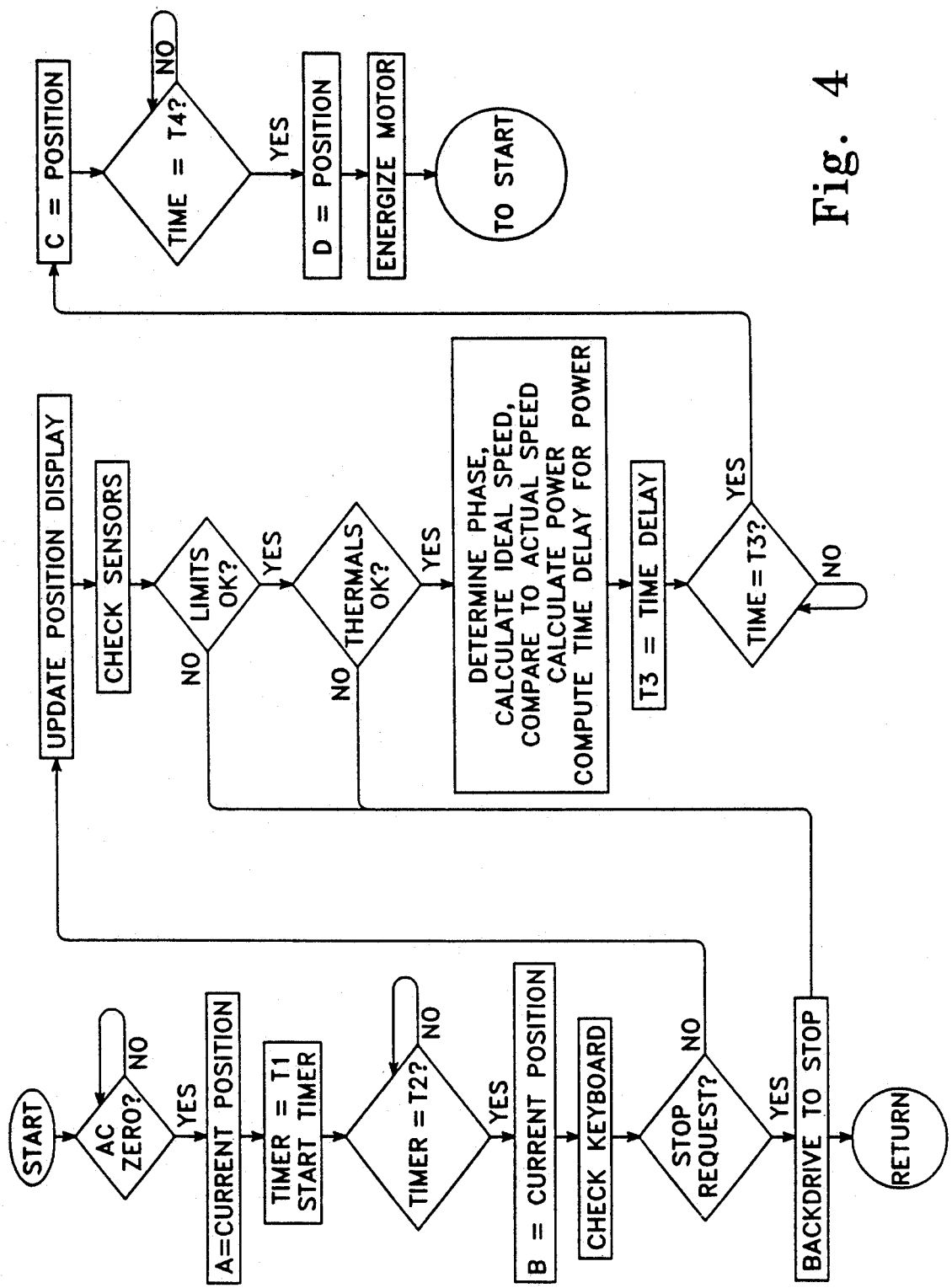
FIG. 4 is a flow chart showing a basic housekeeping sequence performed by the computer between motor drive routines, representing the sequence within a single AC cycle. Power to the motor is calculated dependent upon the drive routine phase number and other factors.
Figure 5:
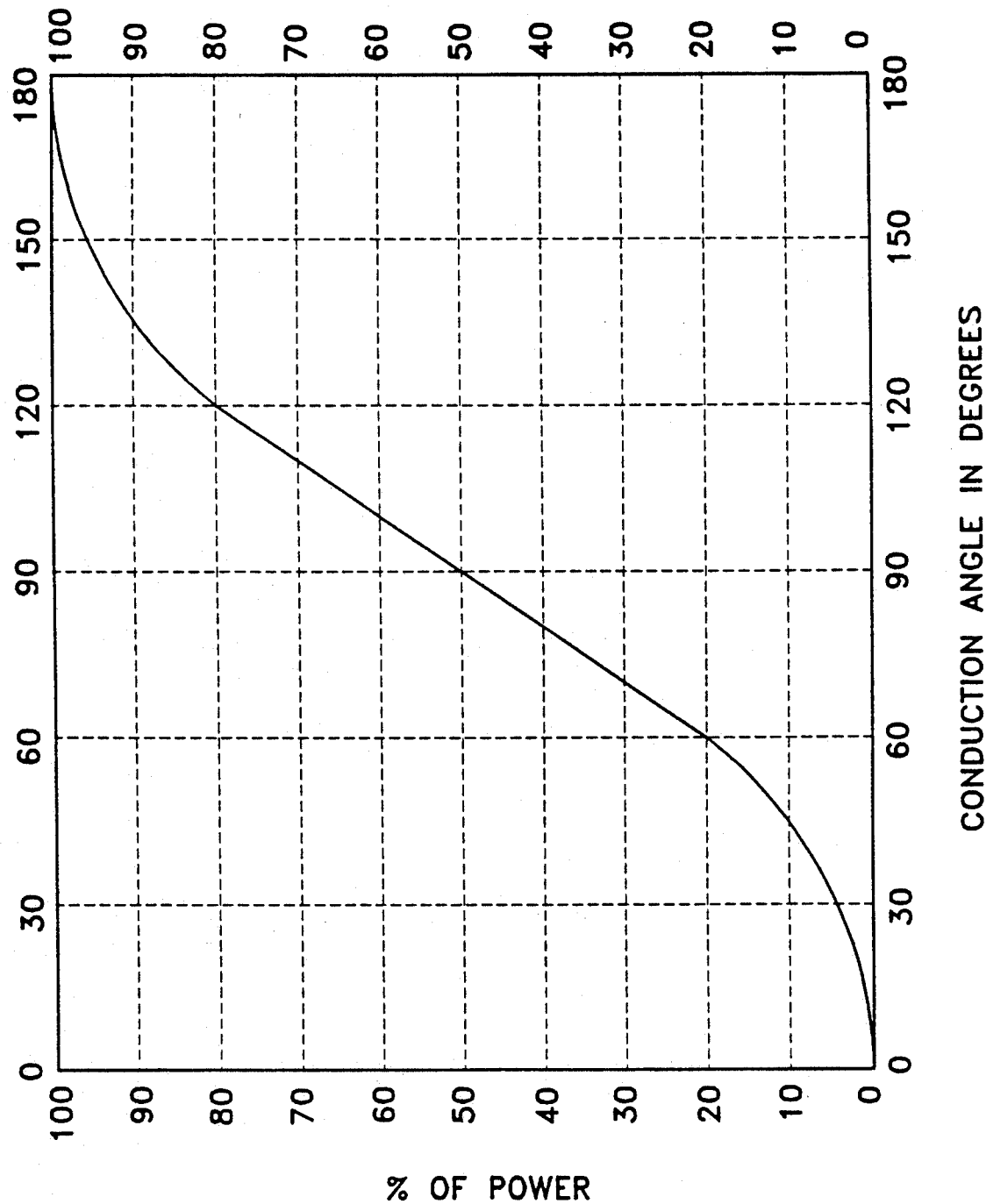
FIG. 5 is a graph showing the relation of AC wave position and effective applied power to the DC drive motor. This power is slightly skewed due to the back EMF of the DC drive motor as it attains higher rotational speeds. The computer steps power up and down which automatically compensates for this skew.

The DC motor drive system 10 is outlined in the block diagram/schematic of FIG. 2. In one embodiment the DC motor 12 is operated by a single triac 13 for half wave mode; but preferably, the drive is switchable between half wave and full wave. With the addition of a full wave bridge 14 and two DPDT relays (for selection of direction and half/full wave operation), full wave operation is achieved. Thus, FIG. 2 shows a full/half wave control block 16 and a direction control block 18, representing the described components. The motor control is generally identified as 15. The motor 12 operates directly off the AC line, from an AC power source 20 as indicated in FIGS. 2 and 3. The computer, i.e. microcontroller 22, measures the AC line for each zero crossing (see FIG. 3), does any necessary housekeeping (FIG. 4 shows housekeeping sequence within a single AC wave), calculates the power to be applied at each power application, determines the time delay from the AC zero crossing, and operates the triac at the appropriate time (FIGS. 4, 5 and 6).

Figure 7:
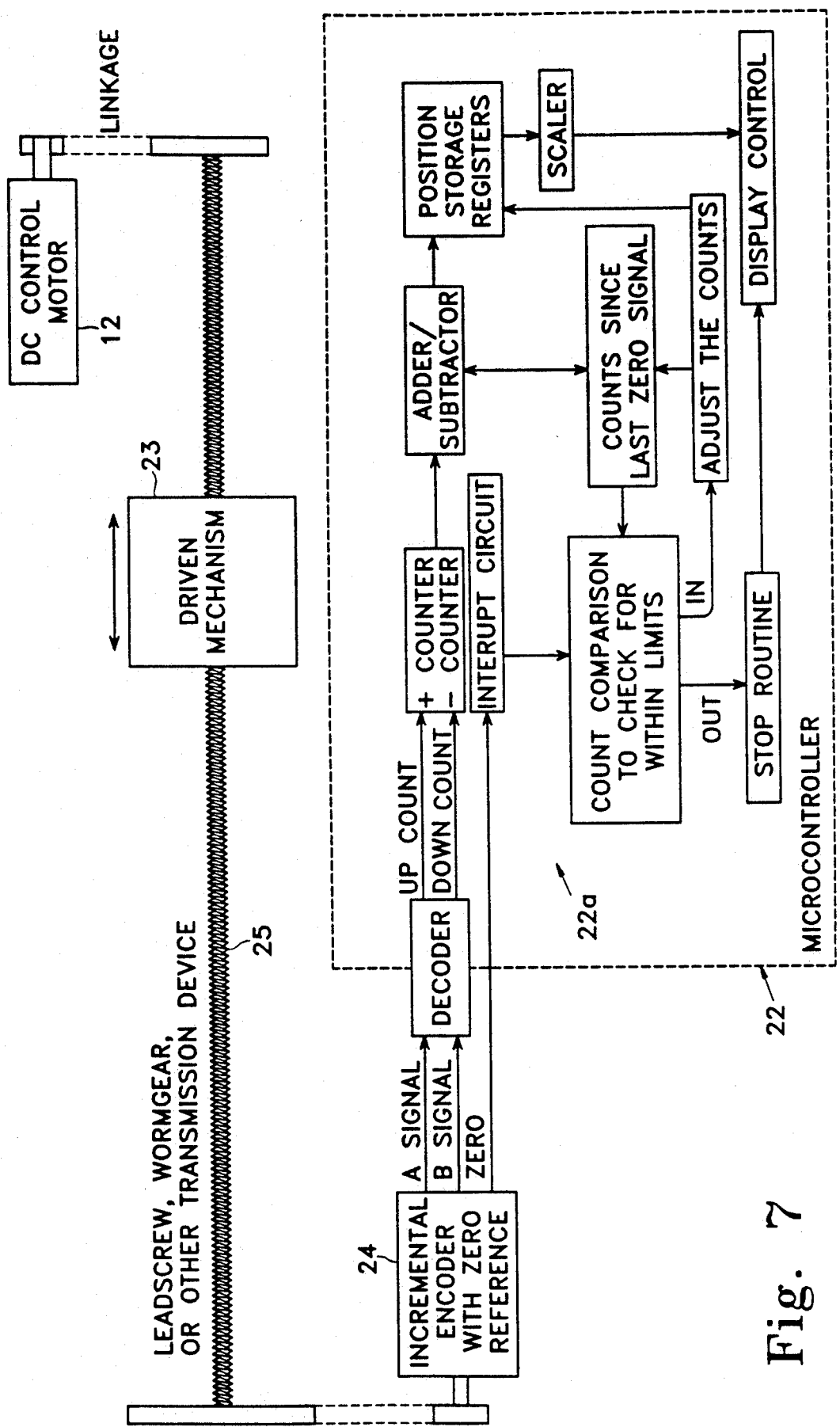
FIG. 7 is a block/schematic diagram showing a counting method preferably used to evaluate position and autocorrection of position in the event that electrical "noise" causes an error to accumulate during the rotation of the encoder.
Figure 8:
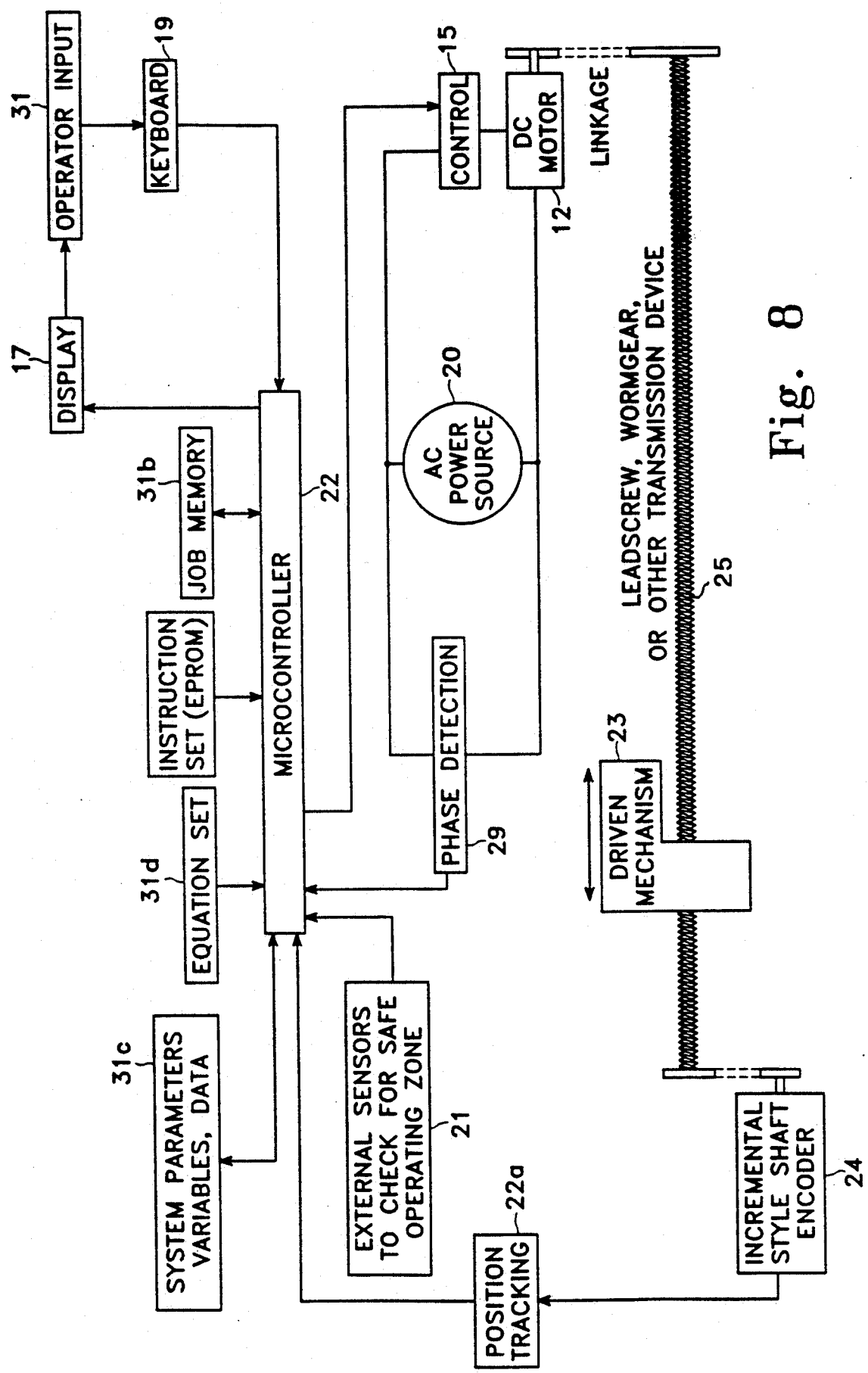
FIG. 8 is a block diagram overview of the entire system.

Position feedback of the driven mechanism 23 to determine velocity and distance to the target (delta), is preferably by means of an incremental shaft encoder 24 with zero set, monitoring a leadscrew 25 or other transmission device coupled to the driven mechanism. The zero set is used to correct position to maintain accuracy each time the encoder completes a full revolution (FIG. 7 shows the counting routine). The correction to the position at each zero set is compensated for during the next velocity check to avoid any chance of motor "bumping". FIG. 8 shows a block diagram overview of the entire system.

FIG. 1 shows the "ideal velocity" path 26 (dashed line) of the driven mechanism or machine element as defined by the basic equations for speed referenced above. The variables placed into the various equations to create the lines making up the ideal path 26 are based initially on historical measurements but are compensated and adjusted during the actual drive of the mechanism. The different phases (1 through 7 in the illustrated embodiment) ar defined by the crossover points of the calculated velocity lines. FIG. 10 best demonstrates this procedure and is described further below. In operation the actual speed may vary from the ideal speed, with an example of actual speed shown in the solid line velocity path 28 in FIG. 1. In operation, the actual speed 28 is compared by the computer to the ideal velocity path 26, which is determined dynamically, to determine if a change of phase is required as the target is approached. All deltas to target during operation are compensated by:

Delta (adjusted) = Delta (current) − e − f where e is a distance computed as the actual velocity (the averaged speed over the last half AC waveform) times the transitional delays based on the sum of the time to achieve zero current in relays (to avoid arcing the contacts), relay switching time, and next power on delays based upon the AC line frequency; and f is a cushion distance to insure adequate time in the creep routines to reliably obtain the required accuracy—i.e. f defines the distance for the creep phases. The distance e therefore is constantly changing and is largest at highest velocity. The Phase 3 speed curve (deceleration) is calculated referenced to the adjusted delta and changes its value dynamically with respect to actual velocity. The entry delta to transition (see dotted line 30) from Phase 2 (or 1) to Phase 3 is variable with respect to speed and the history of system measurement data.

FIG. 2 shows additional blocks relating to the system, operator inputs and storage of data. An operator input is indicated at 31, wherein the operator may enter target information 31a, or multiple information for job memory for a sequence of multiple positioning runs, indicated by job memory 31b. The block 31c, system parameters variables, data, represents system memory for storage of historical data relating to operating parameters, power settings, deceleration curve, coast to stop curve, etc. as further discussed below, as well as current-run information as to mechanism responses to power, backdrive and coast. The equation set 31d contains the basic equations for velocity curve and power calculation, with the appropriate factors for the equations determined from 31c, by history or from the current run.

FIG. 3 is a simple schematic indicating AC zero cross sensing, with a current limiting resistor 33, anode, diode logic 33a and sensors 33b, to signal the microcontroller 32 as to whether AC+ or AC− is sensed. When neither is sensed the system is at zero crossing.

The following discussion refers to FIGS. 4, 5 and 6. The system starts by waiting for the AC zero crossing, and at the zero crossing, current position A is saved and a timer is started. After the timer reaches $T_2$ as indicated in the flow chart, a new current position B is determined and saved. The computer checks the keyboard to check for any stop requests from the operator, and if no, the computer updates the position display to show the operator current position. Any external sensors are checked, and if all is okay and if there are no drive component problems (overheating), then the procedure outlined in FIG. 6 is initiated using the selected time increment from A to B and the change of position. Peak velocity is determined via the span AB, as outlined in the equations in FIG. 6. The calculated speed is then compared to the ideal speed from the ideal velocity curve as calculated and explained below, and the velocity error is calculated. As indicated at the bottom of FIG. 6, observed acceleration is divided by the value of the last power applied, to determine the expected next acceleration per power.

Power is derived as shown in FIG. 5, by increasing or decreasing the percentage of power and reading from a data table the new delay angle. The computer thus looks up the delay angle based on the amount of power required for the next drive cycle.

After the power cycle has been calculated, from the delay angle a time value $T_3$ is calculated, as indicated in the flow chart. When the actual time reaches a value equal to $T_3$, position C (FIG. 6) is recorded. A time delay is implemented wherein a fourth position D is measured. Again, these two positions are used to calculate the minimum speed attained during this drive cycle. The motor is then energized with the amount of power calculated for the next required move. As indicated in the flow chart, the process is then begun again for the next drive cycle.

FIG. 7 is a block diagram outline of the counting function executed by the microcontroller using data from the incremental encoder 24. The position tracking phase of the microcontroller 22 is identified as 22a. An internal decoder controls the counters, which count up or down based on the indication of movement and the direction indicated by the encoder. The counts are added and subtracted, stored as current position, and used to adjust the counts since the last zero signal. At each zero signal an interrupt occurs and the computer compares the count since the last zero to compare and ensure correct position. If the position is within a few counts, the counts since the last zero are zeroed and an appropriate adjustment is made to the current position in the position storage registers. With each AC half wave, the computer scales the encoder counts to show the true position to the operator (see FIG. 4, "Update Position Display").

FIG. 8 shows in a block diagram the overall system control components, adding to FIG. 2 some of the user interface and other features connected to the microcontroller and to the motor 12. The motor controller 15 is shown connected to the motor 12 and receiving instructions from the microcontroller 22. The operator input 31 is shown as part of an operator interface including a display 17 and a keyboard 19. A block 21 in FIG. 8, "external sensors", refers to the decision block in FIG. 4, "limits okay?". These sensors would be placed on the extreme ends of the machine to prevent overrunning of the physical machine limitations.

When a move to target or positioning sequence (target 32 position indicated in FIG. 1) is requested, the computer or microcontroller 22 calculates the "ideal" velocity based on conditions of current velocity, distance to target and response history, with an example of this procedure indicated in FIG. 1. Depending on the distance of the required move, up to seven drive phases are performed, as shown in the embodiment illustrated in FIG. 1. In Phases 1 through 3 a macroadaptation routine is executed, up to Creep 1 entry. A microadaptation routine, at slower speed, is carried out in Creep 1 through 4 (Phases 4 through 7).

In Phase 1 (acceleration phase), the mechanism is accelerated to a maximum speed. A transition occurs at this point (indicated by dotted line 34) and the power is adjusted to the last power required at this particular speed (to minimize speed overshoot and oscillation). Preferably the DC motor is powered with full wave drive.

In Phase 2, speed is monitored and power adjusted to ensure constant velocity. Again, full wave drive preferably is used. The power is stored at each drive cycle for the next Phase 1 to 2 transition, for a succeeding move to a new target position. Distance to the target is monitored with respect to actual velocity and time delays based upon the phase exit/phase entry delays (time delays to reach zero crossing on the AC drive, relay delays and delay to get in phase). When calculations show that the next actual velocity will exceed the "ideal velocity" (to avoid overshooting the target), Phase 3 is entered, as shown at the transition of the path 28 at entry to Phase 3. If the move is long, Phase 2 will be long. It is also emphasized that in FIG. 1 the scale is variable along the position (horizontal) axis.

In Phase 3 the motor is backdriven for any AC cycle where the speed is deemed to be too fast, and forward driven if the actual speed falls far enough below the "ideal" speed so that prediction concludes that a "no power" cycle would leave the speed still below the next calculated "ideal" speed. As Phase 3 is entered the drive is converted to half wave, which allows for backdrive. In FIG. 1 backdrive sequences are seen at b, coast sequences at c and a powered sequence at p.

The use of phases in the positioning routines is better understood with reference to FIG. 10. FIG. 10 shows an acceleration curve 28a, a cap speed or maximum speed line 33 (operator selected at initial machine setup) and a deceleration curve 28b which is determined from historical performance data. FIG. 10 shows the acceleration curve 28a starting from a rest point A (power=zero). Although FIG. 10 shows straight line acceleration, in practice power is increased at first gradually for machine preservation, i.e. to take up any play or backlash very gently before full power is applied. The acceleration behaves basically according to power applied. The computer adjusts power to allow for back emf effects, so that actual acceleration is constant according to operator selection.

As illustrated in FIG. 10, as the cap speed 33 is approached, the computer determines the point at which the next power application will accelerate the mechanism to the point that cap speed will be attained or exceeded. Power is adjusted downward at a point 28c, to a power level which was last required to run the mechanism at cap speed, in a previous positioning run. This allows a smooth transition to cap speed, as illustrated in the graph, with no speed overshoot.

The first time the system is set up on a machine, i.e. in the first positioning run, the cap speed is not known from any previous run and may be arbitrarily set at half power. This will cause oscillation of speed about the operator-selected cap speed 33 in the first run, but speed will stabilize generally to the cap speed 33 and data will be collected as to appropriate power for further runs, i.e. stored as an appropriate cap speed power setting in the historical data.

The deceleration curve 28b, calculated from past performance data, is important in making the transition from cap speed down to a low speed where a creep phase can be entered in an orderly manner. Coming out of Phase 2, the system has too much kinetic energy, and this must be reduced to a minimum, at a point where nearly all of the distance to the target has been traveled (again, the graphs of FIGS. 1 and 10 have a variable horizontal or position scale).

The transition point 35 is defined between Phase 2 and Phase 3, at the point where the cap speed 33 would intersect the deceleration curve 28b, and this transition is also discussed above relative to FIG. 1. The deceleration curve in this preferred embodiment is defined by the equation $v^2 = delta_{adjusted} \times A$, where A is a constant selected by the computer, i.e. an adjustable value determined by the computer based on the amount of deceleration power used for backdrive (if backdrive power is not maximized in a run, this indicates the deceleration curve could be sharper). The equation above in a preferred embodiment is not precisely what is used by the computer in determining the curve 28b, but the computer executes a "fitting" routine, to fit the data to a near-equivalent curve. The curve may actually more closely fit. the equation $v^3 = (delta_{adjusted} \times A)^2$.

FIG. 10 also shows an alternative acceleration curve 28d, wherein the mechanism starts from a position B. This illustrates that the cap speed 33 may never be reached in certain positioning runs, where the initial position B is closer to the target 32. In this instance, the acceleration curve 28d would intersect the deceleration curve 28b at a theoretical point 37 which is below the cap speed 33. The transition to deceleration would occur at the point on the curve 28d where the next acceleration cycle in the AC drive would go beyond the projected curve 28b, with the e distance taken into account. The e distance is the expected motion which would be seen during time delays during phase change—taking into account time to reach a zero current crossing, relay time delays and time to get in phase. This total time, multiplied by the current velocity, gives the e distance. In effect, then, the calculation of the e value offsets the curve 28b to the left, to a new position 28e shown in dashed lines in FIG. 10. Transition of the machine element's motion to approximate the path of the desired deceleration curve 28b occurs by shutting off power, and coasting the mechanism for a time delay as discussed above, associated with phase changes. The transition discussed, involving the offset theoretical curve position 28e, is a method of assuring that the mechanism does not overshoot the desired deceleration curve 28b. It is very undesirable for the actual velocity path to extend outside (to the right of) the curve 28b, since the mechanism is presumably very near the target at the bottom of the deceleration curve (e.g. 0.08 inch to 0.5 inch), and such an error can cause overshoot of the target. Since the e distance calculation assumes that there will be no deceleration over this distance, and in fact there is deceleration, it is conservative in allowing the mechanism to stay under the desired deceleration curve 28b. The e distance is of course greater at higher velocities and smaller at lower velocities as indicated in FIG. 10, such that at very low velocities the dashed line curve 28e will be very close to the actual desired curve 28b.

The example above, involving the acceleration curve 28b, demonstrates a situation where the positioning cycle does not include a Phase 2, but goes directly from Phase 1 to Phase 3.

Following deceleration in Phase 3, a transition is made into any of a series of creep regions when the actual speed falls below the maximum speed calculated to be safe from overshoot (due to anticipated coast calculations). In normal operation the mechanism will not reach zero or negative velocity at the bottom of the deceleration curve. However, it is possible under some circumstances (a burr in the worm drive or other resistance) that such unexpected assists to deceleration could cause zero velocity to be reached or, due to the backdrive nature of the deceleration, negative motion to occur. This does not affect the performance of the system, since it occurs prior to the creep regions, with adequate distance for stabilization before the fallover point is reached.

The creep region selected is based upon distance to the target, actual speed, and mechanism response, both historically and in this positioning cycle. Basically, power adjustments are based on immediate data, while phase changes, base speed in creep, and coast to stop curves are based on historical data. These creep speeds are normally followed by phase order (see FIG. 1, Phases 4, 5, 6, and 7), but can be called upon in any order and recalled if measurements deem this to be necessary. This would normally not be the case unless outside forces act upon elements of the driven system.

As the system exits Phase 3, it is shifted back to full wave power to increase response and maintain smooth operation. The appropriate creep region is selected at the beginning of each drive cycle (see FIGS. 9A to 9D as well as FIG. 1), based on current velocity and delta, to avoid inaccurate settling. The "best" next power is calculated based upon previous and current data. The mechanism is accelerated during applied power and then naturally decelerates when the current from the AC line reaches zero. This acceleration and deceleration is tracked over the time period. At the transition between Phase 3 and Phase 4, the delta or distance to target may be as large as about one-half inch or as small as about 0.080 inch, depending primarily on the f value for the particular machine. If the machine has a lot of coast, this delta will be larger; if the machine is quite stiff, with rapid slowdown, this delta (representing all creep phases) can be quite small. FIGS. 9A, 9B, 9C and 9D show typical values for some machines, at each of the creep phase transition points.

Figures 9A, 9B, 9C, 9D:
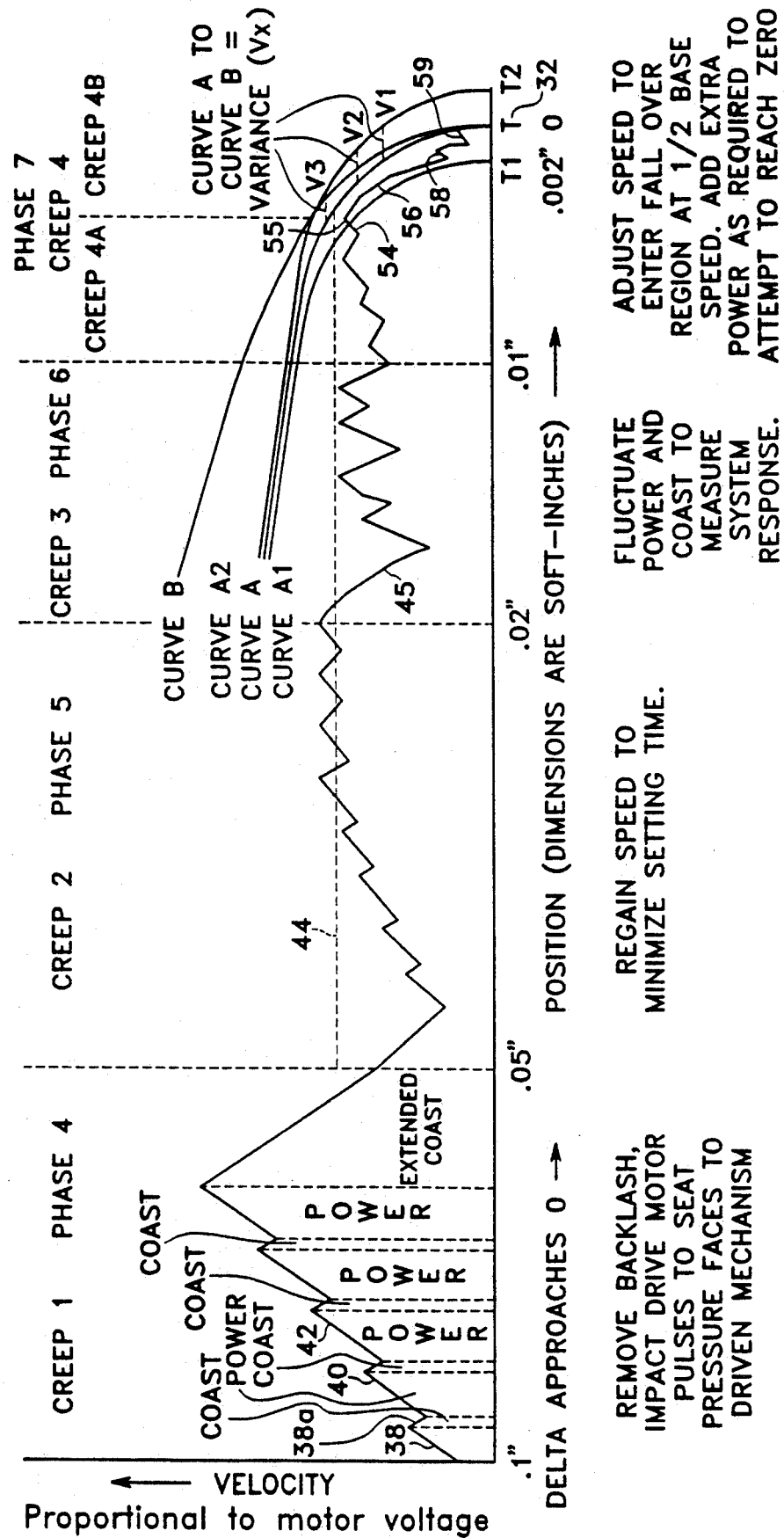
FIGS. 9A, 9B, 9C, and 9D are adjacent portions of a graph showing creep routines of the motor drive system of the invention, which can be generally as represented in Phases 4 through 7, Creep Phases 1 through 4 of FIG. 1.

FIG. 1 and FIG. 9A show the Creep 1 routine, Phase 4, which is used to stabilize the driven mechanism after braking (backdriving). Pressure surfaces on the power transmission components are different during braking. Grease can accumulate, causing a variation in drive as well as a physical position error between the shaft encoder and the driven mechanism. Belt tensions are reversed to slow down from the high speeds. The driven mechanism can accumulate a certain amount of float. A near zero load situation can occur over a short time which would cause irrelevant data to accumulate until the mechanical assemblies can recover to their normal driven state. Minimal accurate data is available at this time. Therefore, when Phase 3 (FIG. 1) is complete, backlash will have accumulated in the transmission (leadscrew).

Figures 5A, 5B:
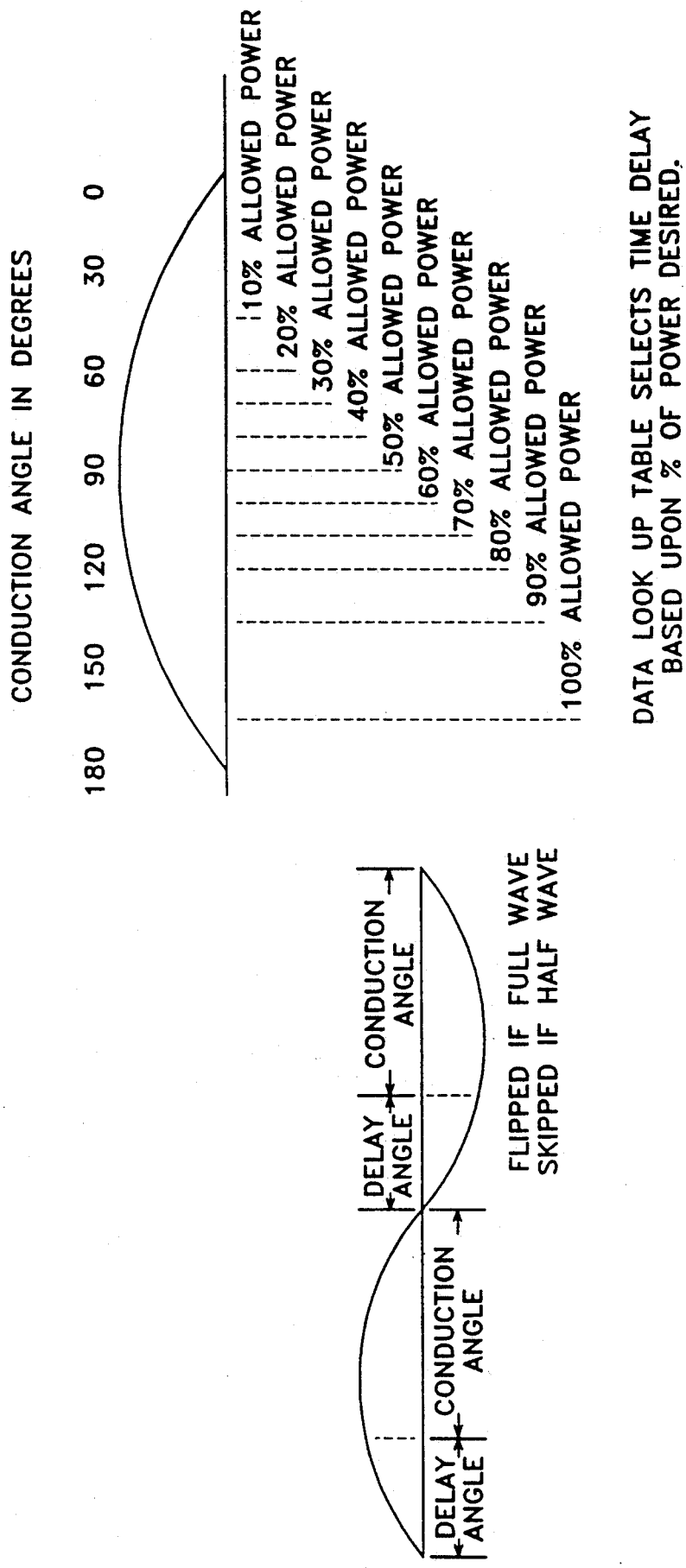
FIG. 5A is a graph showing the AC power wave and conduction angle and delay angle components for effecting drive pulses for the system of the invention.
FIG. 5B is a data lookup table from which the computer selects time delay based on percent of power desired.

Phase 4 (Creep 1) is used to stabilize the driven mechanism after braking, with accurate response data generally not available at this time. A series of "impact" bumps are delivered through the motor to ensure the driven mechanism is properly seated. This is critical to ensure final accuracy, since measurements are being taken from the transmission (leadscrew) rather than directly from the driven mechanism itself. All grease and dirt must be forced away from the pressure faces; then the leadscrew momentum is generally greater than the machine element momentum, keeping the pressure faces in contact. FIGS. 1 and 9A show the power-on impact bumps 38, 40, 42, etc. that are applied, each followed by a short period of coast. The drive cycles 38, 40, 42, etc. shown in FIGS. 1 and 9A represent the power on portions of the AC half wave as illustrated in FIG. 5A. The coast segments 38a, 40a and 42a in these drawing views represent the delay angles in the half waves as shown in FIG. 5A. The peaks of these cycles 38/38a, 40/40a, etc. occur at the zero crossing point of the AC wave. Although only a few bumps of power and coasts are shown in the Creep 1 phase, there may be about twenty in this phase, occurring with each half wave of the AC power (with 120 half waves occurring per second).

FIG. 9B shows the second creep routine, also indicated in FIG. 1 and shown as Phase 5. In this routine the driven mechanism adjusted to a "base speed" 44 from which the system response will be tracked. At this time data is beginning to show signs of stabilization, so that the velocity can be tracked for the final two stages of positioning. The base speed, which is based on historical data and automatically adjustable from positioning routine to positioning routine, is intended to be a safe speed at which the machine element can be returned, to minimize settling time. As the system builds up a history of more positioning routines, assuming consistency of the drive system, the base speed will increase due to greater predictability. The base speed 44 is determined from system response, required accuracy (the value of the settling tolerance), and variance (the amount of uncertainty due to inconsistent operation of the mechanism from the speed curves created as a function of response, discussed further below). As indicated in FIG. 9B and FIG. 1, the attainment of base speed normally is accomplished through a series of power-on and coast steps, until the base speed 44 is essentially straddled. Again, many more power bumps normally will occur in this phase than what is illustrated—full wave power is still employed (since switching to full wave at the Phase 3/Phase 4 transition) and there may be about 30 bumps, one each half wave, over about ¼ second.

FIGS. 9C and 1 show the third creep routine. In this phase the power is adjusted to a variety of levels in order to log acceleration rates and further evaluate deceleration from a variety of speeds. The motor drive preferably is returned to half wave drive at entry to Creep 3, for greater predictability of response. The drawings show speeds (and resulting displacements per cycle) being varied more drastically. This will yield a data base for the final creep routine, i.e. Creep 4, shown as Phase 7. In particular, a long coastdown 45 (FIG. 9C) preferably is initiated wherein one or more of the AC cycles is skipped, without any power bump, in order to evaluate whether this coast profile matches what is expected expect in curve A shown in the Creep 4 region (FIG. 9D). The A curve, which is a conservative coast down curve as discussed below, is based on historical data but will be modified if necessary based on the responses in the Creep 3 phase.

Also in the Creep 3 phase, fairly large power bumps and adjustments to power are used, to monitor the changes in velocity due to differences in the power application. Instead of straddling the base speed 44 as in Creep 2, in Creep 3 (and Creep 4) the system attempts to maintain the speed below base speed.

The final creep routine, Creep 4, is seen in FIGS. 9D and 1, and is also indicated as being divided into phases Creep 4a and Creep 4b in FIG. 9D. This creep phase uses the data saved in the previous phase as well as immediate data collected at each current drive cycle to evaluate how the power should be adjusted. In this phase the system is still gathering data on velocity response to power application, but uses smaller velocity bumps and stays conservatively under the base speed 44. Calculations from the current position and the projected stopping point (if no more power is supplied) are used to evaluate the fall over point to obtain the target 32, i.e. the point at which the driven mechanism, when power is cut off, will fall directly to the target zone. If the distance is too great to ensure the required accuracy in view of the coast uncertainties, then this cycle will be handled as an intermediate cycle to set up for the ideal final speed a distance from the correct fall over point. Once the final cycle can be initiated, power will be adjusted higher or lower to ensure the correct speed is obtained at the right time (and location) to assure final coast to within the defined settling tolerances of the target (the range of $T_1$ to $T_2$, on either side of the target T in FIG. 9D). If slowdown after the tentative fall over point indicates an undershoot result, one or more drive cycles will supply a small amount of power to attempt to create a zero error position.

In FIG. 1 the final power cycle is schematically shown at 50, with a coast cycle 52 bringing the driven mechanism to the target 32. In practice this will normally not occur from a speed as high as indicated in FIG. 1. In FIG. 9D, a more typical example is shown wherein an attempted or presumed final power cycle is indicated at 54, followed by a coast cycle 56 which after initiation is determined to be producing an undershoot result. A further drive cycle 58 is then applied to attempt to reach the target T at zero error. The coast down procedure is identified as Creep 4b in FIG. 9D, since this is a different sub-phase from the data gathering activity shown in Creep 4a. Creep 4b is entered when the presumed or tentative final power cycle 54 takes the actual velocity curve outside the curve $A_1$ shown in FIG. 9D. At this point, identified as the tentative fall over point 55 in FIG. 9D, the system notes that velocity is above the most conservative velocity curve, being inside an envelope of curves $A_1$, A, $A_2$ and B. Curve $A_1$ is the most conservative, since it represents the longest coast, like curves A and $A_2$, but as applied to the short position target tolerance location $T_1$. Curve A is the same curve but applied directly to the ideal target position T, while $A_2$ is the same curve applied to the long tolerance position $T_2$. Curve B, as noted in FIG. 9D, represents the shortest coast (fastest slowdown) from historical data on coast to stop behavior. Curve B is determined as the shortest coastdown experienced during all previous runs of the system, assuming that base speed is reached in such a run. Curve B, in comparison with curve A, defines a maximum variance which can be expected when the machine element coasts to a stop from base speed.

Thus, the envelope between curve A and curve B should ideally result in a coast very near the target T, while within the tolerances. However, the system must be conservative, in case a longer than expected coast occurs, from the point 55. Thus, the programming initiates the fallover or coastdown from the point 55, at which the most conservative curve $A_1$, geared to the short tolerance position $T_1$, has been exceeded.

Curves A and B curve down to the target positions nonlinearly as shown, because of static friction factors. Basically, frictional losses are considerably greater at very low speed than at higher speeds.

Since this is a conservative fallover point 55, it is presumed that more power will be needed in most cases in order to closely approach the ideal target T. As the coast proceeds on the line 56, the system looks for an indicator that it will fall short of the target T. When this indicator occurs, via the position of the curve and the projection that the curve 56 will fall short of the target T, power bumps are initiated. The system remains in half wave drive, so that 60 power cycles per second are available for use in forward pulse after the fallover point 55 (these 60 cycles were used in Creep 4a, prior to the fallover point 55). Along the curve 56 none of the available cycles is used until it is deemed necessary, then a power bump is initiated as shown in 58 in FIG. 9D. Several available power bump cycles will then be skipped, until it is determined that one or more further power bumps is needed. A final power bump or power cycle 59 is shown in FIG. 9D, as enabling the machine element to coast precisely to the target T. However, in actual practice there may be four or five of these power bumps in the fallover region, rather than the two that are illustrated.

Preferably the number of pulses after the presumed fallover point 55 is limited to a relatively small number, such as five. In this way, the programming assures that the driven mechanism will be placed substantially at the target within five pulses, minimizing settling time. If more pulses are required, this indicates the base speed is too high and the system will lower the base speed to the point that a maximum of five pulses (for example) will be required for settling. If, however, the base speed is so low that only one or two power pulses are typically required after the fallover point, the base speed will be increased. If the base speed rises too much, it will intersect the A coast curves farther and farther back from the target, as can be seen from FIG. 9D. This can initiate the fallover point 55 at a too-distant point from the target, causing the velocity curve to fall out of the envelope, then be powered back in, etc., to such an extent that settling time is actually increased. As noted above, the base speed 44 is only tentatively preset but is adjusted according to determined data and fit to the performance characteristics of the driven mechanism.

If unexpected resistance is incurred during the settling phase (e.g., if the operator holds and slows down the leadscrew), this would cause a much faster, shorter coastdown. The programming then recognizes that the projected stopping point will be far short of the target T (and perhaps even $T_1$) and will move the routine back to the Creep 4a routine, again applying a power bump each cycle until the velocity curve is well within the envelope.

In the creep regions (Creep 1, 2, 3 and 4), the degree of risk (the chance of under or overshoot) is selected based upon the programmed settling tolerances ($T_1$, $T_2$—shown as +/− 0.002 inch). High tolerances allow high risks with subsequently faster settling times.

In the discussion above, several references are made to the use of historical data as well as data from the current positioning sequence. The operating parameters derived from history (i.e. from previous positioning sequences), include (a) the power level for cap speed drive, based on the power used in the immediately previous positioning sequence for cap speed; (b) the deceleration curve factor for the Phase 3 deceleration, shown by the ideal curve 26 in FIG. 1, and as discussed above with reference to FIG. 10; (c) the base speed, determined as discussed above regarding the number of power cycles required after the presumed fallover point; (d) the power factor for slow speed entry, to optimize motor response at Creep 1 entry (or other creep phase if the system goes directly to another one), based on the relationship power = B × delta, B being the weighting factor; (e) the distance f, i.e. the "cushion" distance or distance which is determined from historical data as being required as a minimum distance to safely settle into the target (if target overshoots are incurred, f is increased, and A is decreased in the equation $v^2 = \text{delta}_{adj} \times A$) (once the value A is stabilized from repeated positioning sequences, the transition to Creep 1 will become more and more consistent as to position with respect to the target. At that point the system attempts to shorten f in order to minimize the time requirements for the creep routines); (f) curve A, which is stored as a lookup table of data of velocity versus coast distance, projected to stop (although curve A may be adjusted during the sequence, as explained above); and (g) curve B, although curve B is not actively used in the settling sequence.

All other power adjustments are based upon current response, during the current positioning sequence.

Although the preferred embodiment of the invention is described as using an SCR controlled DC motor, this same drive routine could also be used with other types of drive devices, such as an IGBT (insulated gate bipolar transistor) module, for driving either a DC motor or a three-phase AC motor.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. An adaptive velocity tracking drive control positioning system, for moving a machine element or driven mechanism in a positioning sequence and precisely positioning the machine element at a target position, comprising:

a drive motor with electric motor drive means, power transmission means operatively connected to drive the machine element or driven mechanism, with linkage means for connecting the power transmission means to the drive motor, position encoder means for determining the current position of the drives mechanism and for sending signals representing such current position, microcontroller means for receiving signals from the position encoder means and for controlling the application of drive power to the drive motor via the motor drive means, operator input means connected to the microcontroller means, for enabling an operator to enter information prior to the start of a positioning sequence, including information regarding one or more target positions at which the driven mechanism is to be stopped, data storage means connected to the microcontroller means, for storing information relating to characteristics of motion of the driven mechanism, including response of the driven mechanism's motion to applications of power via the drive motor, and coasting characteristics of the driven mechanism in absence of power to the drive motor, driving control program means associated with the microcontroller means for automatically and adaptively tracking velocity and velocity changes of the driven mechanism and adaptively improving performance of the system through a series of positioning sequences to quickly and accurately reach target positions and including (a) means for causing a series of powered accelerations and coasting decelerations during a positioning sequence and for gathering data regarding the resulting motion response of the driven mechanism during such accelerations and coasting decelerations;

(b) means for storing a history of resulting motion response of the driven mechanism, from previous positioning sequences as well as from the current positioning sequence, in the data storage means;

(c) means for maximizing speed of movement of the driven mechanism toward the target maintaining speed stabilization and predictability as the target is approached;

(d) means for moving the driven mechanism in one or more creep phases just before the target is reached, wherein speed is limited essentially to a relatively slow base speed and wherein motion of the driven mechanism is constantly maintained;

(e) means for storing in the data storage means a predictive coast to stop pattern for the driven mechanism; and (f) means for cutting off a final application of power to the drive motor at the correct position and speed such that the driven mechanism coasts to a stop substantially at the target position, by comparing actual speed and position to the predictive coast to stop pattern stored in the data storage means.

2. A drive control positioning system according to claim 1, wherein the power transmission means includes a rotating shaft and the encoder means comprises incremental shaft encoder means for monitoring position of the rotating shaft of the power transmission means, thereby monitoring position of the driven mechanism indirectly.

3. A drive control positioning system according to claim 1, wherein the drive motor is a DC motor and the motor drive means comprises an SCR control for the motor.

4. A drive control positioning system according to claim 3, wherein the motor drive means includes means for switching from full wave drive to half wave drive in response to control by the microcontroller means, during the course of a positioning sequence.

5. A drive control positioning system according to claim 1, wherein the driving control program means further includes means for causing backdriven decelerations via backdrive power pulses to the motor during a positioning sequence and for gathering data regarding the resulting motion responses of the driven mechanism during such backdriven decelerations.

6. A drive control positioning system according to claim 1, wherein the drive control program means further includes means for initially accelerating the driven mechanism to a preselected maximum speed in positioning sequences of great enough distance to safely do so without overshooting the target position, and for maintaining speed essentially at the maximum speed for an appropriate distance, then decelerating the driven mechanism including with backdriven decelerations by applications of backdrive power pulses, to decelerate the driven mechanism to near zero speed, prior to entry of said creep phases.

7. A drive control positioning system according to claim 6, wherein the driving control program means includes establishing a base speed for the creep phases based on data from previous positioning sequences, and for maintaining speed of the driven mechanism essentially below the base speed during one or more final creep phases, prior to the cutting off of the final application of power.

8. A method for automatically moving a machine element or driven mechanism in a positioning sequence and precisely positioning the driven mechanism at a target position, using adaptive velocity tracking drive control, comprising:

providing a drive motor with electric motor drive means, connected via linkage means to a power transmission means operatively connected to drive the driven mechanism, sensing current position of the driven mechanism using a position encoder, and sending signals from the position encoder representing such current position, providing a microcontroller connected to the position encoder, with data storage means and an operator interface connected to the microcontroller, the microcontroller further being connected to the motor drive means, receiving signals from the position encoder in the microcontroller, controlling the application of drive power applied to the drive motor by the motor drive means, using the microcontroller, entering, via an operator, one or more target positions at which the driven mechanism is to be stopped in a positioning sequence, during a positioning sequence, recording response of the driven mechanism's motion to applications of power via the drive motor and coasting characteristics of the driven mechanism in absence of power to the drive motor, automatically and adaptively, in the microcontroller, tracking velocity and velocity changes of the driven mechanism and adaptively improving performance of the system through a series of positioning sequences to quickly and accurately reach target positions, including the steps of (a) initially accelerating the driven mechanism to a maximum speed or cap speed, provided the positioning sequence involves a distance to target position sufficiently long to enable reaching maximum speed, in a first phase, (b) maintaining the driven mechanism substantially at maximum speed for an appropriate time, in a second phase, (c) in a deceleration phase, decelerating the driven mechanism to near zero speed, including using backdrive power pulses to the motor for backdriven deceleration cycles, (d) in a first creep phase, accelerating the driven mechanism in a series of power pulses followed by coasting, and gathering data regarding the motion response of the driven mechanism during the power pulses and coasting, and taking out backlash in the power transmission and driven mechanism during such first creep phase, (e) stabilizing speed of the driven mechanism substantially to a base speed which is lower than the maximum speed, (f) gathering further data including characteristics of driven mechanism coast near the target position, while remaining essentially below the base speed, (g) in a final creep phase, reaching a point determined from stored data to be a tentative fallover point from which the driven mechanism can coast, and from all available data, will not overshoot the target but will likely undershoot the target, (h) initiating a coast of the driven mechanism from such tentative fallover point, and determining whether the coast is predicted to undershoot the target, and when so determined, adding intermittent increments of power to the motor and finally cutting off power at a final fallover point of speed and position wherein the driven mechanism will coast substantially to the target position, with near-zero error.

9. The method of claim 8, wherein the motor is a DC motor driven with an AC motor drive, and further including using full wave drive to drive the motor in the first two phases, switching to have wave drive for deceleration in the third phase and switching back to full wave drive on entering the creep phases.

10. The method of claim 9, further including switching back to half wave drive prior to the tentative fallover point, for greater motor control.

11. The method of claim 8, further including establishing an ideal deceleration curve for deceleration in the third phase, based on historical data from previous positioning sequences, and including decelerating the driven mechanism in said third phase in a manner attempting to follow the ideal deceleration curve as closely as possible.

* * * * *

UNITED STATES PATENT AND TRADEMARK OFFICE
CERTIFICATE OF CORRECTION

PATENT NO. : 5,249,118
DATED : September 28, 1993
INVENTOR(S) : Wayne T. Smith

It is certified that error appears in the above—identified patent and that said Letters Patent is hereby corrected as shown below:

Column 15, line 35, correct "drives" to read --driven--.

Column 15, line 64, correct "response" to read --responses--.

Column 15, line 68, correct "response" to read --responses--.

Column 16, line 4, after "target" insert --while still--.

Signed and Sealed this

Sixteenth Day of August, 1994

Attest:

BRUCE LEHMAN

*Attesting Officer*     *Commissioner of Patents and Trademarks*